No. 652,154. Patented June 19, 1900.
J. A. WILDING.
GUN CARRIAGE OR OTHER VEHICLE.
(Application filed Aug. 28, 1899.)
(No Model.) 2 Sheets—Sheet 1.

No. 652,154. Patented June 19, 1900.
J. A. WILDING.
GUN CARRIAGE OR OTHER VEHICLE.
(Application filed Aug. 28, 1899.)

(No Model.) 2 Sheets—Sheet 2.

Witnesses
Inventor
James Armstrong Wilding

UNITED STATES PATENT OFFICE.

JAMES ARMSTRONG WILDING, OF LONDON, ENGLAND.

GUN-CARRIAGE OR OTHER VEHICLE.

SPECIFICATION forming part of Letters Patent No. 652,154, dated June 19, 1900.

Application filed August 28, 1899. Serial No. 728,738. (No model.)

*To all whom it may concern:*

Be it known that I, JAMES ARMSTRONG WILDING, a subject of the Queen of England, residing at 11 Clerkenwell Close, London, England, have invented certain new and useful Improvements in or Relating to Gun-Carriages or other Vehicles, (for which application has been made for Letters Patent in Great Britain under No. 16,302, dated August 10, 1899,) of which the following is a specification.

This invention may be applied to various kinds of vehicles where it is desired that at certain periods the motion of the springs should be intercepted; but I will describe it as applied to gun-carriages, where it is particularly useful for light quick-firing guns to provide a stable foundation, which it is difficult or impossible to obtain if the body of the vehicle is supported upon springs.

In carrying out my invention I construct the vehicle in any desired manner and with any desired form of springs, though I find a suitable form to comprise a straight or cranked axle having at each end a pair of coiled springs. To the vehicle body or frame two slotted brackets operating by a pair of horn-plates of a railway-vehicle are secured, the axle playing in the slots between the plates. In order to prevent this play when it is desired to eliminate the motion of the springs, a wedge, block, cam, or equivalent device is inserted in the slot above the axle or is otherwise applied so as to prevent the relative movement between the axle and the vehicle-body. By this means the body is for the time being rigidly connected with the axle, and so with the wheels, thus obtaining the object of the invention.

Figure 1:
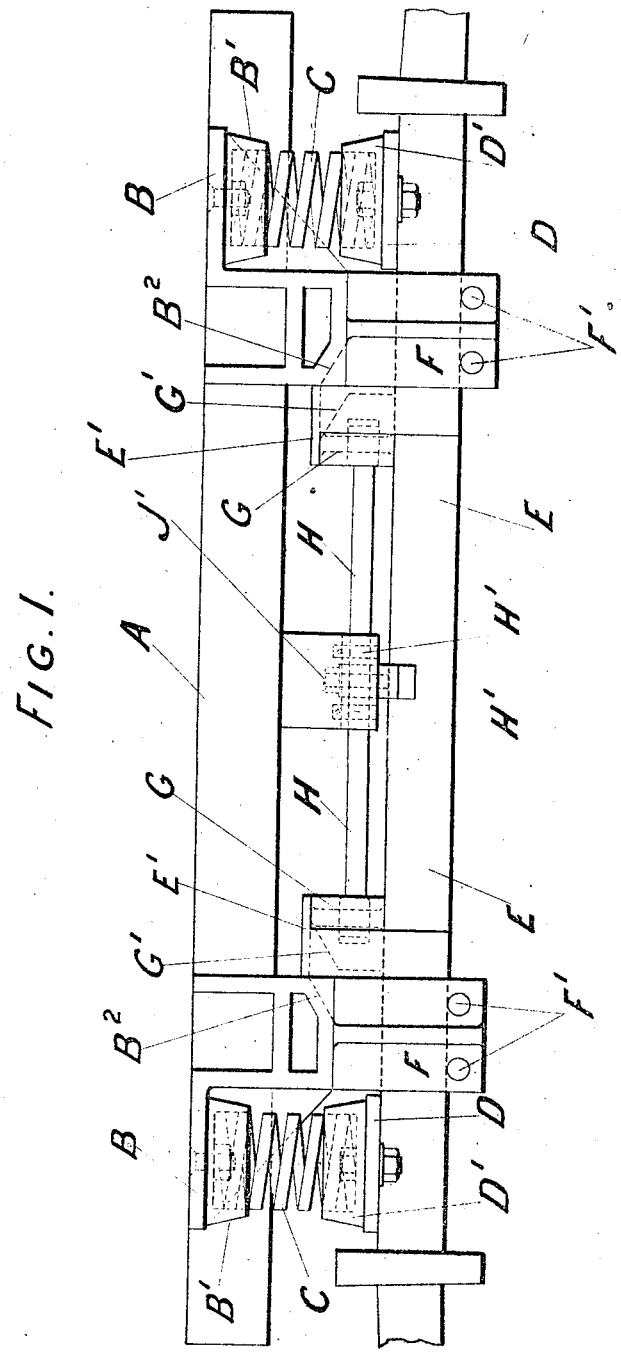
Figure 2:
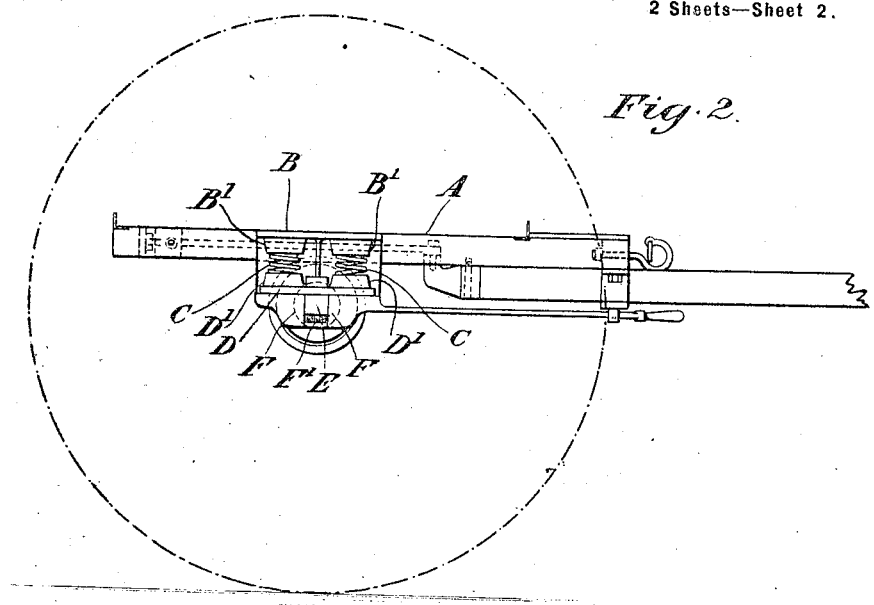
Figure 3:
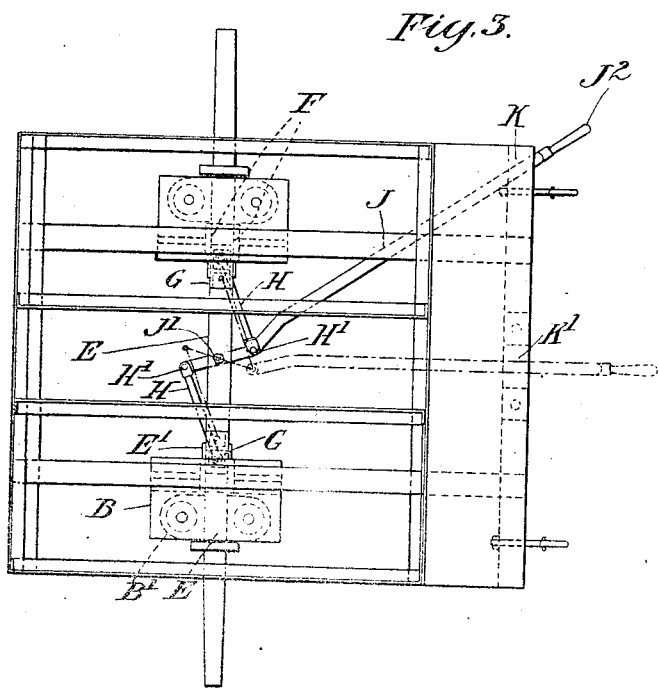

In the accompanying drawings, Figure 1 is a front elevation of the framing of a gun-carriage, showing the invention applied to a vehicle of this type. Fig. 2 is a side elevation of the same. Fig. 3 is a plan of the same.

Like letters indicate like parts throughout the drawings.

Upon the framing A, on each side of the vehicle, is arranged a bracket B, provided on its under side with cups B' for the reception of the upper ends of coiled springs C, whose lower ends rest in cups D', formed on a plate D, mounted on the axle E. The latter is square and arranged so that it can move vertically between horn-plates F carried by the framing A. The horn-plates are connected beneath the axle by pins or bolts F'. The under side of the bracket B in the upper part of the slot formed by the horn-plates above the axle is provided with an inclined surface $B^2$, and on the axle rests a block G, provided with a corresponding inclined surface G', this block being so arranged between guides E' carried on the axle that it can be slid along the latter into the slot between the horn-plates, with the inclined face G' against the inclined surface $B^2$. When in this position, the block G will lock the framing A and the axle E together, so as to prevent the action of the springs C and provide a stable foundation when it is desired to fire the gun.

Two blocks G are provided, one for locking each side of the axle, these blocks being connected by links H, which are pivoted at H' to a lever J, which is pivoted at J' on the axle E, about its center. The lever J is provided with a handle $J^2$ to enable it to be moved for the purpose of throwing the blocks G in or out of engagement with the slots in the brackets B. Catches K and K' are provided on the framing A in such a position that they will engage with and retain the lever J in the necessary positions when the blocks G are in or out of operation. The blocks G act as wedges for the purpose of lifting the framing on the axle until the bolts F' are brought up against the under side of the axle. In Fig. 1 the blocks are shown out of engagement, while in Fig. 3 they are shown in engagement with the slots in the brackets B, the position of the lever, links, and blocks when out of engagement being shown in this figure by chain-lines.

The handle extension of the arm may operate in conjunction with a rigid plate or other means of fixing it in either of its extreme positions.

It will be appreciated that although the above-described arrangement is suitable many other means could be employed by which the motion of the springs could be prevented, and this invention would include such arrangements within its scope. In an alternative arrangement the locking effect would be secured by drawing the body and axle together, instead of separating these parts. In yet another the locking of the axle in the brackets, which carry it in its normal position without necessarily moving it either nearer to or farther from the vehicle-body, could be effected in many ways—as, for example, by the insertion of a bolt or plunger through suitable holes, so as to lock the parts.

What I claim as my invention, and desire to secure by Letters Patent, is—

1. The combination of an axle, a frame, springs interposed between the axle and frame, two parts formed with oppositely-inclined surfaces arranged between the axle and frame, one of said parts being movable into and out of engagement with the other, and means for shifting the movable part, substantially as described.

2. The combination of an axle, a spring-supported frame carried thereby having an inclined bearing-surface, a movable block upon the axle provided with an inclined face adapted to engage the bearing-surface of the frame, and means for shifting the block, substantially as described.

3. In a vehicle the combination of a carriage-body and wheel-axle, springs interposed between the carriage-body and wheel-axle, guides to control the relative movement of the carriage-body and wheel-axle, transversely-movable wedge-shaped blocks G for locking the wheel-axle in the guides and lever J connected by links H to the blocks G for the purpose of effecting the movement of the latter as set forth.

In testimony whereof I have hereto set my hand in the presence of the two subscribing witnesses.

JAMES ARMSTRONG WILDING.

Witnesses:
ALFRED J. BOLUT,
HARRY B. BRIDGE.